Dec. 11, 1951  J. D. GAY, JR  2,577,885
BODY LIFTING DEVICE
Filed Oct. 19, 1949  2 SHEETS—SHEET 1

INVENTOR.
JACOB DOUGLAS GAY, JR.,
BY

ATTORNEYS.

Dec. 11, 1951   J. D. GAY, JR   2,577,885
BODY LIFTING DEVICE
Filed Oct. 19, 1949   2 SHEETS—SHEET 2

INVENTOR.
JACOB DOUGLAS GAY, JR.,
BY
ATTORNEYS.

Patented Dec. 11, 1951

2,577,885

UNITED STATES PATENT OFFICE 2,577,885

BODY LIFTING DEVICE

Jacob Douglas Gay, Jr., Pine Grove, Ky., assignor to Gay Bell Corporation, Paris, Ky., a corporation of Kentucky Application October 19, 1949, Serial No. 122,263

6 Claims. (Cl. 280—44)

My invention relates to a body lifting device for use on a vehicle having a plurality of supporting wheels and where it is necessary to vary the elevation of the vehicle from the ground, but to maintain it at all times parallel with the ground.

My body lifting device is particularly adaptable for use with farm implements which are drawn through the field by a wagon or tractor and wherein the clearance of the bed or frame of the implement must be varied with reference to the ground, but remain parallel thereto. Such a farm implement is a seed stripper, such as shown in my copending application, Serial No. 105,689, filed July 20, 1949, and entitled Comb Wiper for a Seed Stripper. In the drawings and in the description which follows, I will show and refer to my body lifting device as being incorporated in such a seed stripper, but it is to be understood that I do not intend to limit my invention to seed strippers, since it is adaptable to many other vehicles for many other applications, and the drawings and specification are merely exemplary and to assist in the description in showing my novel body lifting device.

In the case of a seed stripper as shown in the drawings, a stripper comb is moved over the ground and is carried by a framework supported by two wheels, one at each end. It is desirable to maintain the comb parallel with the ground at all times, but it is occasionally necessary to raise or lower the comb depending upon the length of the seed stock to be stripped. As is apparent, this is done by raising or lowering the wheels at each end of the framework the same amount, so that the comb will move upwardly or downwardly, but maintain its parallelism with the ground. In usual practice, in order to do this, it is necessary to independently move each wheel an identical distance, which necessitates separate individual adjustment for each wheel and the checking of the distances of each end of the frame from the ground after each adjustment.

It is an object of my invention to provide a body lifting device wherein the movement of one wheel upwardly or downwardly in reference to the frame automatically moves the other wheels the same distance without the necessity of separately adjusting each wheel.

It is a further object of my invention to provide a body lifting device wherein the operator merely forces one wheel downwardly by power means and the movement of this wheel automatically moves the other or remaining wheels.

It is a further object of my invention to provide a body lifting device or a wheel adjuster which is extremely rugged and simple in form, easy to repair and maintain, but which in its action is sure and adaptable for field use.

These and other objects of my invention which will be set forth hereinafter or will be apparent to one skilled in the art upon reading these specifications, I accomplish by that certain construction and arrangement of parts of which I shall now describe an exemplary embodiment. Reference is now made to the drawings forming a part hereof and in which.

Figure 1:
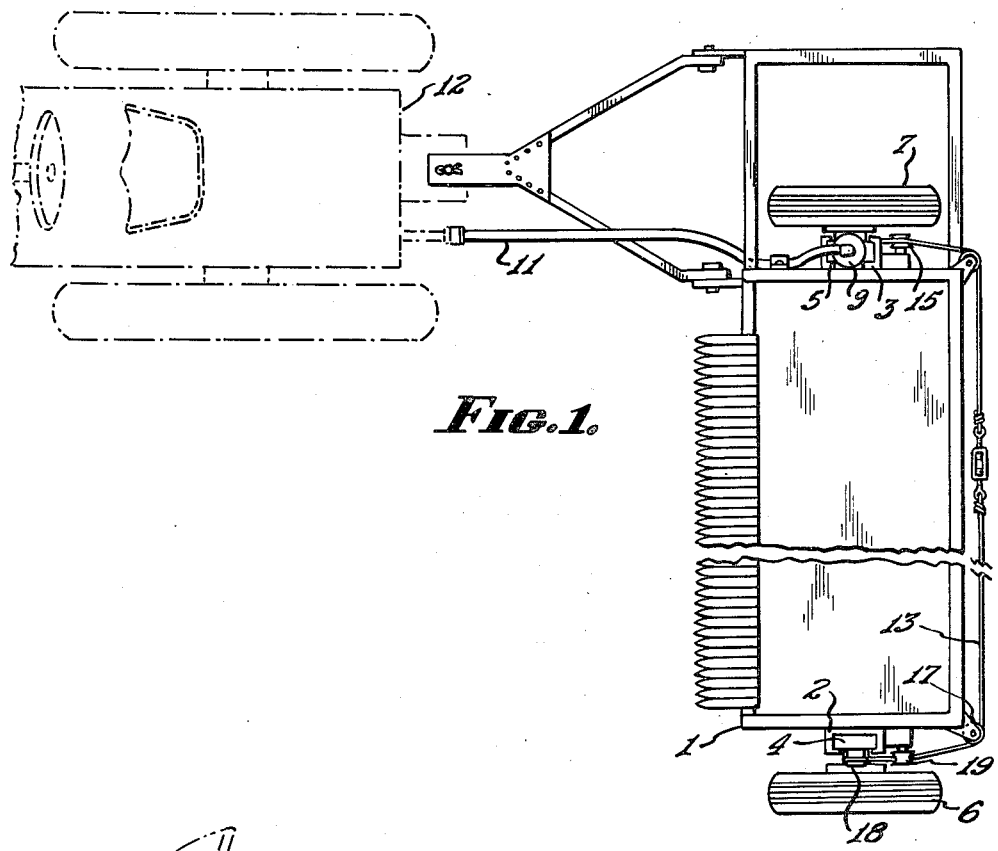
Figure 1 is a plan view of a seed stripper showing my novel body lifting device.

Briefly, in the practice of my invention, I provide vertical tracks on each end of the stripper which carries a vertically movable slide. On the lower end of the slide, I mount the wheel so that as the slide moves upwardly or downwardly in the track, the wheel decreases or increases its distance to the frame of the stripper, thus raising or lowering the frame in relation to the ground upon which the wheels rest.

One of the slides is operated by a power mechanism such as a hydraulic ram or the like. A cable is attached to the lower end of this slide and runs over a sheave or pulley mounted on the frame of the vehicle adjacent the slide, but at a point higher than the lower end of the slide. The cable then runs substantially horizontally across the frame of the vehicle to the other slide carrying the outlying wheel. In this case, the end of the cable is attached to the upper end of the slide after passing over a sheave mounted on the frame adjacent the slide but substantially lower than the upper end of the slide at all times. From this, it is apparent that as the power driven slide moves downwardly, the cable pulls the other slide or slides downwardly the same amount, thus insuring that all the wheels move downwardly the same distance. When the power slide is raised, the other wheels, of course, move up a similar distance due to the weight of the framework, settling down on the slides carrying the wheels.

Referring to the drawings, the stripper frame 1 carries a set of tracks 2 and 3 at each end thereof. While in the description and in the drawings I will refer to and show the seed stripper having only two wheels, it is to be understood that it is within the contemplation of my invention to provide more than two wheels, if necessary.

Riding within the tracks 2 and 3, I provide a slide 4 and 5 carrying wheels 6 and 7 mounted by means of hubs or stub axles 8 on the lower end of the slides.

A source of power 9 which is shown in the drawings as a hydraulic ram, is mounted on the frame 1 of the stripper with its piston rod 10 attached to the upper end of the slide 5. The fluid operating the ram is received through the hose 11 from a pump and its control (not shown) on the tractor 12 shown in broken lines. While in the drawings I have shown a hydraulic ram, it is to be understood that any fluid actuated ram, including a pneumatic ram or any other source of power may be used for the purpose of driving the slide 5. The hydraulic ram shown is only exemplary.

A cable 13 is attached as at 14 to the lower end of the power operated slide 5 or to the axle of the wheel 7. A sheave or pulley 15 is mounted on the framework adjacent the slide 5, but at a point well above the point 14 at all times. The cable 13 runs over pulleys 16 and 17 to the other slide 4, which carries the other or remote wheel 6. In this case, the end of the cable 13 is attached to the upper end 18 of the slide 4 after running over a sheave 19 mounted on the frame adjacent the slide 4, but well below the point 18 at all times.

Figure 2:
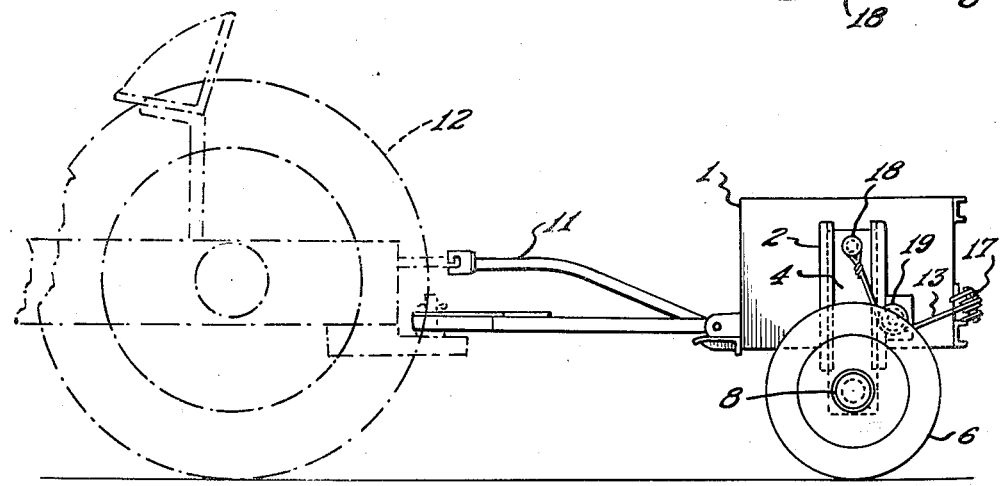
Figure 2 is an end elevation of the stripper shown in Figure 1.
Figure 3:
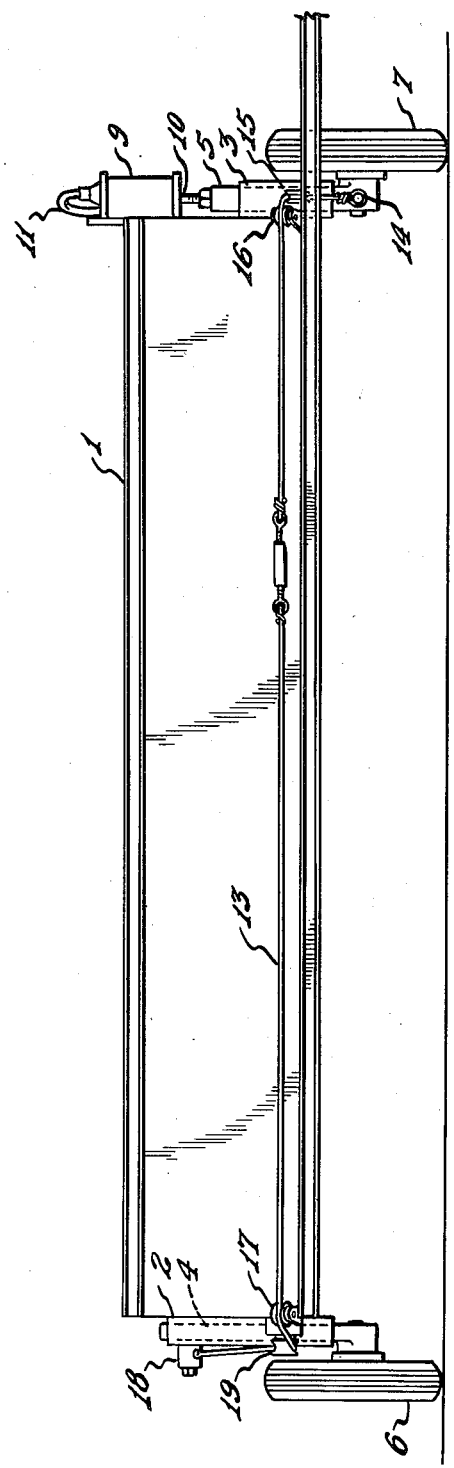
Figure 3 is a rear view of the stripper taken from the right in Figure 2.

From the above, it is apparent that when the slide 5 is moved downwardly to extend the wheel 7 by means of the ram 9, the cable 13 is moved to the right in Figure 3. The movement of the cable 13 pulls the upper end 18 and the slide 4 downwardly the same distance that the driven slide 5 is moved, thus insuring that both wheels 6 and 7 are moved the same distance from the frame 1.

Where more than two wheels are used on the frame or body, all of the wheels with the exception of the wheel mounted on the power actuated slide 5 are mounted on slides similar to slide 4 in Figure 2 and a cable is either run from the power actuated slide 5 to each of the other wheel slides, or a single cable originating at the power actuated slide 5 carries branch cables to the other slides, all of which are run over sheaves and pulleys as shown in the drawings. In this way, when slide 5 is moved downwardly, all of the other slides carrying their wheels will be moved downwardly the same distance and thus maintain the frame or body of the device substantially parallel to the ground at all times.

From the above it is apparent that a single operator either riding on the tractor 12 or on the stripper itself by controlling the pressure in the cylinder 9 and thus moving the power driven slide 5 upwardly or downwardly at the same time, moves all of the outlying wheels the same distance and in the same direction.

It should be noted that my device is extremely simple and easy to repair and maintain. The cable 13 may be easily renewed or replaced or tightened when necessary and adjustment may be made where necessary, by inserting a turnbuckle in the cable 13 at some point along its horizontal stretch. My device is open and easy to oil and grease where necessary and adds very little weight to the over-all weight of the stripper or other vehicle on which it is mounted. The resilience of the cable 13 to some extent acts as a cushion for all of the wheels in this device, and where desirable, a cable may be used having a very high coefficient of elasticity and thus increase the cushioning of the device on the ground, while in the other cases where this cushioning is not desirable, a cable having very little elasticity may be used.

It is to be understood that different forms of my preferred forms may be made without departing from the spirit of my invention.

Having thus described my invention, what I claim as new and desire to secure by Letters Patent is:

1. A body lifting device for a vehicle having a plurality of sustaining wheels comprising a support for each wheel vertically slidably mounted on the vehicle frame, power means adapted to force one support downwardly with reference to the frame and a cable attached to said power forced support and to another support and running over sheaves mounted on the frame so located with reference to the supports as to move all of them together and in the same direction with the movement of the power forced support.

2. A body lifting device for a vehicle having a plurality of sustaining wheels, comprising a support for each wheel vertically slidably mounted on the vehicle frame, said supports comprising a vertically elongated slide riding in tracks, said wheels being mounted adjacent the lower end of said slides, a cable fastened to the lower end of one slide and running over a sheave mounted on the frame adjacent the slide and higher than the lower end thereof, the other end of said cable fastened to the upper end of another slide after passing over sheaves adjacent thereto and lower than its upper end to which the cable is attached so that the vertical movement of the first slide will move another slide vertically the same distance.

3. A body lifting device for a vehicle having a plurality of sustaining wheels, comprising a support for each wheel vertically slidably mounted on the vehicle frame, said supports comprising a vertically elongated slide riding in tracks, said wheels being mounted adjacent the lower end of said slides, a cable fastened to the lower end of one slide and running over a sheave mounted on the frame adjacent the slide and higher than the lower end thereof, the other end of said cable fastened to the upper end of another slide after passing over sheaves adjacent thereto and lower than its upper end to which the cable is attached so that the vertical movement of the first slide will move another slide vertically the same distance, and power means mounted on the vehicle frame adapted to move the first slide.

4. A body lifting device for a vehicle having a plurality of sustaining wheels, comprising a support for each wheel vertically slidably mounted on the vehicle frame, said supports comprising a vertically elongated slide riding in tracks, said wheels being mounted adjacent the lower end of said slides, a cable fastened to the lower end of one slide and running over a sheave mounted on the frame adjacent the slide and higher than the lower end thereof, the other end of said cable fastened to the upper end of another slide after passing over sheaves adjacent thereto and lower than its upper end to which the cable is attached so that the vertical movement of the first slide will move another slide vertically the same distance, and power means mounted on the vehicle frame adapted to move the first slide, said power means comprising a fluid actuated cylinder enclosing a piston having a rod attached to the upper end of the first slide.

5. A body lifting device for a vehicle having a plurality of sustaining wheels, comprising a support for each wheel vertically slidably mounted on the vehicle frame, said supports comprising a vertically elongated slide riding in tracks, said wheels being mounted adjacent the lower end of said slides, a cable fastened to the lower end of one slide and running over a sheave mounted on the frame adjacent the slide and higher than the lower end thereof, the other end of said cable fastened to the upper end of another slide after passing over sheaves adjacent thereto and lower than its upper end to which the cable is attached so that the vertical movement of the first slide will move another slide vertically the same distance, said cable being appreciably resilient.

6. A body lifting device for a vehicle having a plurality of sustaining wheels, comprising a support for each wheel vertically slidably mounted on the vehicle frame, said supports comprising a vertically elongated slide riding in tracks, said wheels being mounted adjacent the lower end of said slides, a cable fastened to the lower end of one slide and running over a sheave mounted on the frame adjacent the slide and higher than the lower end thereof, the other end of said cable fastened to the upper end of another slide after passing over sheaves adjacent thereto and lower than its upper end to which the cable is attached so that the vertical movement of the first slide will move another slide vertically the same distance, said cable including a turnbuckle for varying its length.

JACOB DOUGLAS GAY, JR.

REFERENCES CITED

The following references are of record in the file of this patent:

UNITED STATES PATENTS

| Number | Name | Date |
|---|---|---|
| 1,117,836 | Griffith | Nov. 17, 1914 |
| 1,225,644 | Kandlbinder | May 8, 1917 |
| 2,000,229 | Heise | May 7, 1935 |
| 2,187,879 | Johnson | Jan. 23, 1940 |
| 2,227,762 | Ronning | Jan. 7, 1941 |